United States Patent
Asjes

(10) Patent No.: US 6,285,185 B1
(45) Date of Patent: Sep. 4, 2001

(54) APPARATUS AND METHOD FOR DETERMINING THE TYPE OF A BATTERY OR ACCUMULATOR BY USE OF MAGNETIC FIELDS

(75) Inventor: Ronald J. Asjes, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 08/078,791

(22) Filed: Jun. 16, 1993

(30) Foreign Application Priority Data

Jul. 22, 1992 (EP) .................................................. 92202257

(51) Int. Cl.[7] ........................... G01N 27/72; G01K 33/00
(52) U.S. Cl. ................................................................ 324/239
(58) Field of Search ..................................... 324/228, 226, 324/234, 236, 239, 262, 445, 426, 232

(56) References Cited

U.S. PATENT DOCUMENTS 2,346,830 * 4/1944 DeLanty ............................... 324/232

FOREIGN PATENT DOCUMENTS

1043481 * 9/1983 (SU) ..................................... 324/239

WO 91/15036 10/1991 (WO) .

* cited by examiner

Primary Examiner—Walter Snow
(74) Attorney, Agent, or Firm—Ernestine C. Bartlett; Norman N. Spain

(57) ABSTRACT

In an apparatus for determining the contents of a battery or accumulator (10), the inductive coupling provided by the battery or accumulator (10) between an excitation coil (20) and a sense coil (30) is measured. To improve the selectivity of the apparatus magnets (41, 42) are provided that generate a quasi-static magnetic field during a measurement. The quasi-static magnetic field saturates the iron in an ornamental jacket of the battery or accumulator (10) so that the inductive coupling between excitation coil (20) and sense coil (30) is almost completely determined by the interior of the battery or accumulator (10). The inductive coupling at different frequencies, with and without the quasi-static magnetic field, yields a reliable identification. The excitation coil (20) can be energised by a current source (21, 22, 23) generating an alternating current with constant amplitude. Thereby, the signal in the sense coil (30) is insensitive to the change in self-induction of the excitation coil (20) due to the presence or absence of a battery (10).

9 Claims, 3 Drawing Sheets

Figure 1:
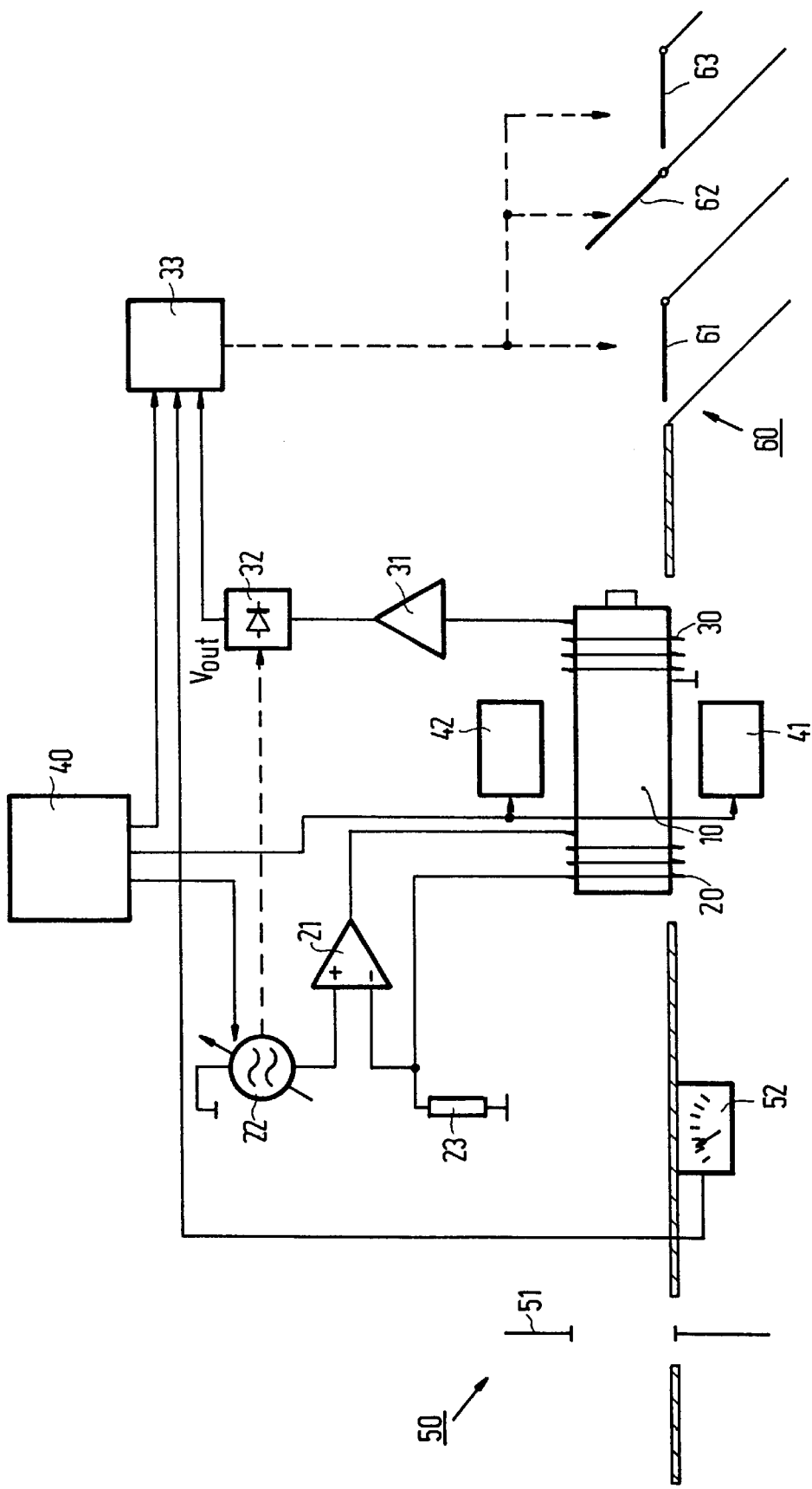

APPARATUS AND METHOD FOR DETERMINING THE TYPE OF A BATTERY OR ACCUMULATOR BY USE OF MAGNETIC FIELDS

The invention relates to an apparatus for determining the type of a battery or accumulator, the apparatus comprising at least one excitation coil coupled to energising means for generating an alternating magnetic field, means for placing the battery or accumulator in said alternating magnetic field and detection means for measuring the induction during the presence of the battery or accumulator in the alternating magnetic field. An application of such a device is the separation of used primary and secondary batteries according to their chemical contents. Separation is desirable for recycling certain types of batteries without contamination by other types or for disposal of spent batteries in special dumps for hazardous waste without filing up the special dump with large amounts of batteries with non-hazardous contents.

The invention also relates to a method for determining the type of a battery or accumulator, comprising the steps of placing a battery or accumulator in an alternating magnetic field having at least one frequency;

measuring an induction caused by the presence of the battery or accumulator in the alternating magnetic field; and classifying the battery in accordance with the measured induction.

Such an apparatus and method are known from WO 91/15036. In that document a method and an apparatus is described in which a battery or accumulator (primary or secondary battery) is placed in an excitation coil which, when energised, induces a magnetic flux in the battery. The flux is detected by means of a sense coil. The induced current in the sense coil is analyzed in analyzing means and provides information about the material of the battery or accumulator, enabling to identify the battery as being of a certain type. A drawback of the known method and apparatus is that the selectivity between some of the types of batteries is insufficient, causing a significant overlap in the identification.

Alternative ways of selection, for example by weight, by measuring the force acting upon the battery in a static magnetic field, by measuring the magnetic permeability or any combination of those, also provide insufficient selection due to the large spread of these parameters within a class of batteries and the overlap between different classes. In addition, the different kinds of measurements to be performed reduce the speed of measurement considerably.

It is, inter alia, an object of the invention to provide an apparatus and method for the identification of batteries that is more selective than the known method and apparatus.

To this end, the apparatus in accordance with invention is characterised in that the apparatus further comprises means for establishing a quasi-static magnetic field in the battery or accumulator during the measurement of the induction, said quasi-static magnetic field being applied for causing a substantial saturation in at least a portion of ferromagnetic parts of the battery or accumulator. The invention is based upon the insight that a major reason for the lack of selectivity of the known method is that, presently, many batteries and accumulators are provided with protective and ornamental jackets made of steel (iron). Due to these jackets many batteries have a large iron content which dominates the electromagnetic properties. When the steel jacket is saturated by the quasi-static magnetic field, the magnetic induction for the alternating magnetic field is largely determined by the interior of the battery.

The quasi-static magnetic field is a magnetic field that is substantially constant on the time scale of a measurement, for example, ten to twenty periods of the alternating magnetic field. In view of this time scale, the quasi-static magnetic field may cycle with a frequency about two orders of magnitude below the frequency of the alternating magnetic field. The quasi-static field can be applied both by means of electromagnets or permanent magnets. Permanent magnets provide a constant magnetic field and do not consume energy, while electromagnets allow adjustment of the field strength and simple on and off switching for measurements with and without the saturating magnetic field. The quasi-static magnetic field can be arranged in any direction, but preferably it is oriented perpendicular to the longitudinal axis of the battery. The strength of the quasi-static magnetic field is subjected to an upper limit. Accumulators such as Ni—Cd and Ni(M)H, comprise a ferromagnetic metal (Ni) in the interior which metal should not become completely saturated.

A preferred embodiment of the apparatus according to the invention is characterised in that said detection means comprise at least a sense coil placed near the excitation coil and in that said excitation and sense coils are arranged for surrounding the battery or accumulator during measurement of the induction. In this embodiment the excitation and sense coils form a transformer in which the battery or accumulator under test acts as the transformer core. In this arrangement an inductive coupling almost completely formed by the battery between the coils is achieved, resulting in a measurement with large sensitivity.

An embodiment of the apparatus according to the invention may be further characterised in that the energising means are arranged for energising the excitation coil with an alternating current of constant amplitude. Excitation by an alternating current with a constant (top—top) amplitude generates an alternating magnetic field with a constant amplitude as well, irrespective of the self-induction of the excitation coil. The latter will change due to the presence of the battery or accumulator near the coil. In contradistinction to the apparatus known from WO 91/15036, which uses excitation by an alternating voltage, in the present embodiment the source of excitation as detected by the sense coil is constant.

The apparatus according to the invention can be further characterised in that the energising means is arranged for energising the excitation coil with a low frequency in the range between about 1 kHz and about 5 kHz, preferably around 3 kHz, and/or with a high frequency above about 10 kHz, preferably around 40 kHz. At low frequency alternating magnetic fields have a large penetration depth. Consequently, the induction measured at low frequency reflects the composition of the battery as a whole. As it takes a number of periods, for example ten, of the alternating magnetic field to perform a measurement, higher frequencies are favoured to reduce measurement time. A frequency of about 3 kHz provides a value for which the whole battery contributes to the measured induction and for which the duration of a measurement is short enough for sorting large amounts of batteries and accumulators economically. At higher frequencies eddy currents at the surface become important and the penetration depth is reduced. Above about 10 kHz, the composition of the outer layers of the battery gradually dominates the measured induction. At about 40 kHz only a relative thin layer, in as far not saturated by the quasi-static magnetic field, contributes while the technical requirements for the energising means and the excitation coil are still economically feasible. Generating an alternating magnetic field at significantly higher frequencies becomes more complicated and more expensive.

An embodiment of the apparatus according to the invention may be further characterised in that the energising means is arranged for energising the excitation coil with an intermediate frequency in the range between about 5 kHz and about 10 kHz. An additional measurement in this frequency range, in particular in the range between 6 and 8 kHz, provides a distinction between batteries and accumulators with a large ferromagnetic content in the outer layer and with a large ferromagnetic content in the interior. An example of the first type is the alkaline battery and of the second type the Ni—Cd and Ni(M)H accumulator.

An embodiment of the apparatus according to the invention is characterised in that the energising means is arranged for simultaneously energising the excitation coil at various frequencies and in that the detection means is arranged for measuring the induction at the various frequencies simultaneously. Simultaneous measurement at the various frequencies further reduces the measurement time.

An embodiment of the apparatus according to the invention is characterised in that said means for establishing a quasi-static magnetic field comprise a current source coupled to said excitation coil for providing a quasi-static current thereto. In this embodiment the excitation coil is used to generate the quasi-static magnetic field as well. Special electromagnets for generating the quasi-static magnetic field are not needed, resulting in a smaller and simpler mechanical construction.

An embodiment of the apparatus in accordance with the invention is further characterised in that it is provided with a weighing arrangement for weighing batteries and accumulators. The weight or density of a battery or accumulator provides additional information about the interior and provides a means of selection for those types that are not discriminated by means of low or high frequency measurements. Selection of miscellaneous types on basis of weight is, for example, possible for alkaline batteries without ornamental jacket, Li—Cl, and Pb-acid accumulators, which types give approximately the same results in the induction measurements.

The apparatus according to the invention may be further characterised in that it is provided with a sorting arrangement for selecting batteries or accumulators with predetermined dimensions, prior to the measurement of the induction. As batteries have standardised sizes and the excitation and sense coils and detection means are dimensioned for a specific size, a selection according to size is desirable to avoid wrongly sized batteries or accumulators to slip into the coil for another size and to cause a misidentification.

The invention also relates to a method for determining the type of a battery or accumulator. According to the invention the method is characterised in that the battery or accumulator is subjected to a substantially constant magnetic field during the activation of an alternating magnetic field. As stated hereinbefore, the substantially constant or quasi-static magnetic field allows the reduction of the influence of ferromagnetic material in the battery during the determination of the magnetic properties of the interior. A preferred embodiment of the method is characterised in that the battery or accumulator is subjected to a low-frequency alternating magnetic field with a frequency in the range of about 1 kHz to about 5 kHz, preferably around 3 kHz in the absence of a sizable constant magnetic field;

a low-frequency alternating magnetic field at the same frequency simultaneous with a sizable and substantially constant magnetic field; and a high-frequency alternating magnetic field with a frequency above about 10 kHz, preferably around 40 kHz, simultaneous with a sizable and substantially constant magnetic field.

These, and other more detailed aspects of the invention will now be elucidated by way of example with reference to the accompanying drawings.

The drawings show in

Figure 2:
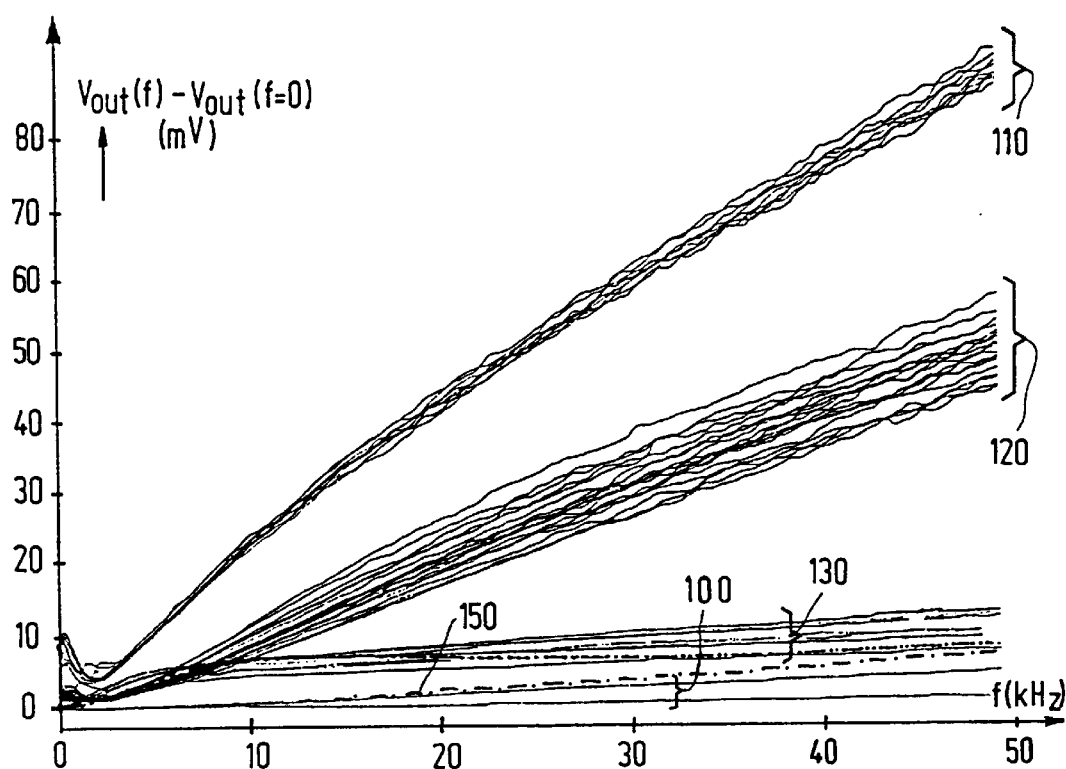
Figure 3:
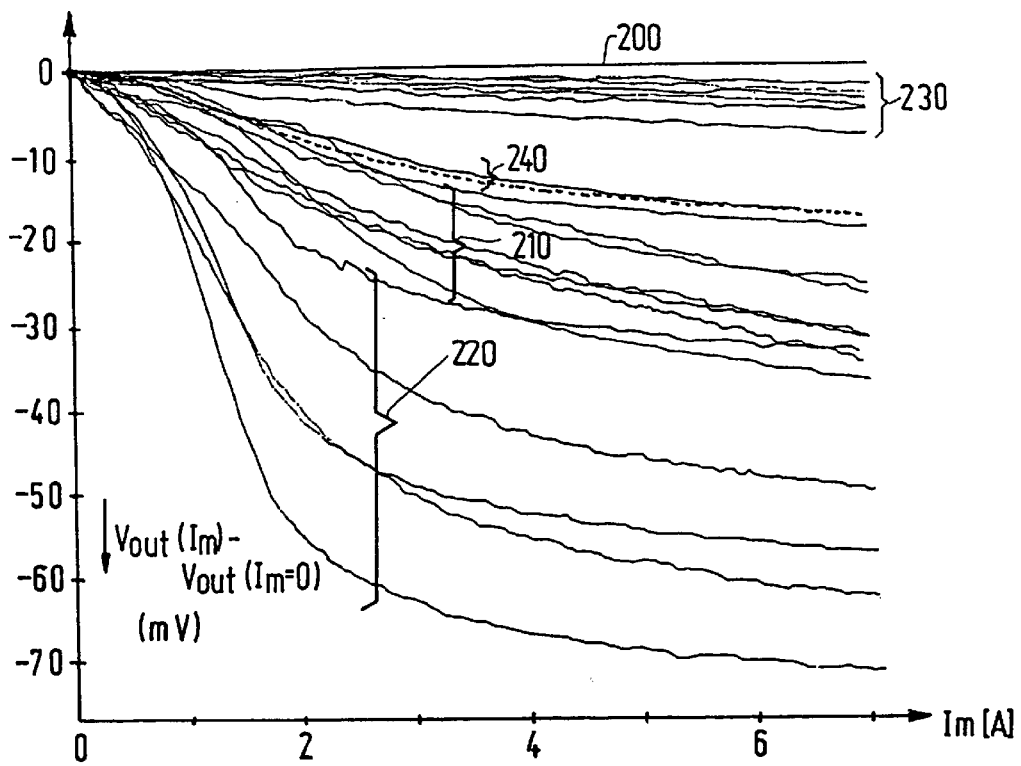
Figure 4:
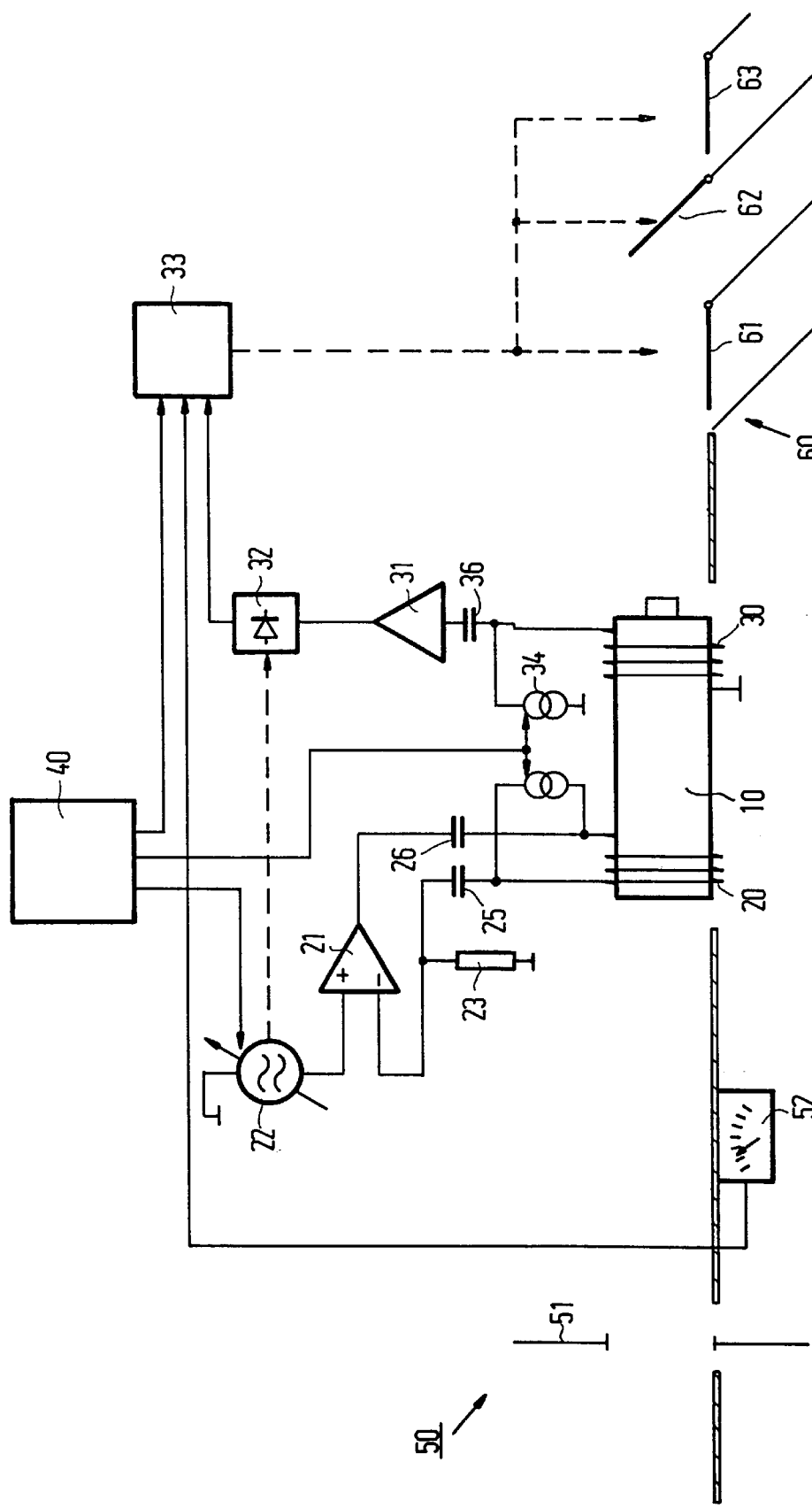

FIG. 1 an apparatus for determining the type of a battery or accumulator and for selecting in accordance with the present invention;

FIG. 2 graphs representing the difference in induction of various types of batteries as a function of the frequency of the alternating magnetic field, in the presence of a static saturating magnetic field;

FIG. 3 graphs representing the difference in induction of various types of batteries in an alternating magnetic field at a frequency of 4 kHz as a function of the strength of the static saturating magnetic field; and in FIG. 4 an apparatus according to the invention with an alternative arrangement for generating a quasi-static magnetic field.

In FIG. 1 an apparatus for the selection of different types of batteries according to their contents is diagrammatically shown. The apparatus contains two hollow coils, an excitation coil 20 and a sense coil 30. In the bore of the coils a battery or accumulator 10 can be placed. The excitation coil 20 is connected to energising means, indicated by an amplifier 21 and an oscillator system 22. The oscillator system 22 can be set to generate an output at various frequencies. In the shown embodiment the amplifier 21 is a differential amplifier, of which the output and the inverting input are coupled to two terminals of the excitation coil 20. Because of the resistor 23 the inverting input of the differential amplifier 21 receives a voltage that is proportional to the current through the excitation coil 20. The non-inverting input of the amplifier 21 is coupled to the output terminal of the oscillator system 22. By this arrangement the energising means generates an alternating current in the excitation coil 20 and an alternating magnetic field with amplitudes that are independent of the self-induction of the coil, irrespective of the presence or composition of a battery or accumulator 10 near or inside the coil 20.

The sense coil 30 is connected to an amplifier 31 and a rectifier 32. The output signal of the rectifier 32 is a measure of the magnetic coupling between the excitation coil and the sense coil. The rectifier 32 may be coupled to the oscillator system 22 for synchronous detection of the signals induced in the sense coil. The apparatus further contains a pair of electromagnets 41 and 42 for establishing a constant or quasi-static magnetic field during the course of a measurement. In stead of electromagnets 41 and 42, permanent magnets can be applied as well. In the entrance path 50 are provided means 51 for selecting batteries and accumulators according to size, thereby ensuring that only batteries are measured for which the coils 20 and 30 and the energising means are dimensioned. The apparatus may be further provided with a scale 52, for example in the entrance path 50, for determining the mass of a battery or accumulator under test by means of weighing.

The operation of the apparatus is controlled by means of a control unit 40. The control unit 40 is connected to a power supply, not shown, for switching on and off the electromagnets 41 and 42 establishing the quasi-static magnetic field and for adjusting its strength. The control unit 40 also controls the oscillator system 22. For sorting batteries and accumulators there is provided a sorting mechanism 60 for directing measured batteries to one of a number of exits, for example by means of gates 61, 62 and 63 that are steered from an analyzing unit 33. The analyzing unit 33 is coupled to the control unit 40, the rectifier 32 and the scale 52.

A full identification and subsequent sorting of a battery or accumulator may proceed as follows. In the entrance path 50, the battery is selected as to size by the sieve-like device 51. Wrongly sized batteries are rejected and have to be presented to an similar apparatus which is dimensioned for that size. If a preselection on size was made before, the device 51 can be absent. If a battery is accepted it is weighed using a load detector or scale 52, the weight, or mass, of the battery is transmitted to the analyzing unit 33. The load detector or scale 52 can also be placed after the coils. Then the battery is entered into the excitation and sense coils 20 and 30, in a way that it forms an inductive coupling between the two coils and is subjected to alternating magnetic fields at a single or at several frequencies. At at least one of the frequencies a quasi-static saturating magnetic field is applied simultaneously with the alternating field. For each of the different situations the output signal of the rectifier 32 is determined and input to the analyzing unit 33. The analyzing unit may provide an output that switches the sorting mechanism 60. Then, the battery or accumulator under test is routed to an exit specific for batteries with similar responses and comparable weight.

The sequence of measurements and the separation strategy could be as follows:

Step 1: determine $V_{out}(1a)$ by a measurement at a low frequency of 3 kHz without a saturating magnetic field and $V_{out}(1b)$ by a similar measurement at an intermediate frequency of 6 to 8 kHz. Only Zn—C (zinc-carbon) batteries without an ornamental jacket have a low value for $V_{out}(1a)$ and are hereby identified.

Step 2: determine $V_{out}(2)$ by a measurement at the same low frequency in the presence of a saturating magnetic field. The difference $V_{out}(2)-V_{out}(1a)$ is low or very low for Ni—Cd (nickel-cadmium) accumulators.

Step 3: determine $V_{out}(3)$ by a measurement at the intermediate frequency of 6 to 8 kHz with a saturating magnetic field. For Ni(M)H (nickel-(metal)-hydride), and also for Ni—Cd accumulators, the difference $V_{out}(3)-V_{out}(1b)$ is low.

Step 4: determine $V_{out}(4)$ by a measurement at a high frequency of 40 to 50 kHz with a saturating magnetic field. $V_{out}(4)$ is high or very high for alkaline batteries with an ornamental jacket, $V_{out}(4)$ has an intermediate value for Zn—C batteries with an ornamental jacket and $V_{out}(4)$ has a low value for a rest group comprising alkaline batteries without an ornamental jacket, Li—Cl (lithium-chloride) and Pb-acid (lead-acid) accumulators.

Step 5: determine the weight for separation of the rest group. R6 size alkaline batteries, Li—Cl and Pb-acid accumulators have weights of about 20–25 g, 15 g and more than 30 g, respectively.

The measurement strategy can be adopted in accordance to the batteries to be separated. For example, if it can be expected that no Ni(M)H accumulators are present, measurements at 6 to 8 kHz need not be necessary. The strategy is based upon the fact that scanning at different frequencies probes the amount and structure of ferromagnetic components in the battery or accumulator, while the saturating magnetic field "removes" ferromagnetic material in the outer layer or layers from the inductive coupling between excitation and sense coils.

In a practical embodiment of the separation apparatus, the various frequencies can be applied simultaneously. By using frequency selective filters in the detection means and by synchronous detection the resulting signals can be separated. Of course, the various frequencies will have to be chosen such that they do not influence each other, in particular that a higher frequency is not at the frequency of a harmonic of a lower one. The quasi-static magnetic field may be a very low frequency alternating field as well. For example, a quasi-static magnetic field being a 10 to 60 Hz sine wave provides saturation around the top of the sine wave while the saturation is negligible when the sine passes zero. The quasi-static field is effectively switched on and off 20 to 120 times per second. As a full measurement at 3 kHz takes about 10 periods or approximately 3 to 4 ms, the change of the quasi-static magnetic field is small in such a period. As 20 to 120 measurements can be made per second, the speed of sorting is probably limited by the mechanical transportation system of the batteries and accumulators.

FIG. 2 shows for various types of batteries of R6 size (AA, mignon or penlight) the response in an excitation-sense coil arrangement as described with relation to FIG. 1. Plotted is the difference in signal size $V_{out}(f)-V_{out}(f=0)$ at the output of the rectifier 32 as a function of the excitation frequency $f$ with simultaneous application of a constant saturating magnetic field. The origin at the vertical axis is adjusted such that all batteries have the same response without alternating magnetic field, i.e. at $f=0$. The curves 100 indicated the Zn—C batteries without ornamental jacket, and without ferromagnetic contents, they have a low or very low signal especially at low frequencies. At higher frequencies three bands are visible. An upper band 110, indicating the alkaline batteries with ornamental jacket, a middle band 120 formed by the Zn—C batteries with ornamental jacket and a lower band 130 comprising the remaining types of batteries. The dashed line 150 indicates the response of the empty arrangement.

FIG. 3 shows, also on a relative scale, the difference in signal size $V_{out}(I_m)-V_{out}(I_m=0)$ at a constant frequency $f$ of 4 kHz as a function of the current $I_m$ trough the magnets 41 and 42 establishing the saturating magnetic field. The curve 200 indicates the Zn—C batteries without ornamental jacket. As these batteries have no ferromagnetic components, the saturating magnetic field has no influence. The curves 220 are formed by the Zn—C batteries with ornamental jackets. As these have a relative minor amount of ferromagnetic metal located at the outmost layer, these are most sensitive to the saturating field. The group of curves 210 are formed by alkaline batteries with and without ornamental jackets. The curves 240, close to the curves 210 of the alkaline batteries originate from Li—Cl and Ni(M)H accumulators. As these have an intermediate amount of ferromagnetic metal, or an internal structure suppressing eddy currents in the metal, they are sensitive to the influence of the saturating field, but less than the Zn—C batteries with ornamental steel jackets. The last group of curves 230 are formed by the Ni—Cd accumulators. These have a large amount of ferromagnetic metal and an internal structure that does not suppress eddy currents.

In FIG. 4 an alternate embodiment of the apparatus is shown. Components that are similar to components shown in FIG. 1 are referred to with the same reference symbols and are not discussed in detail. In this embodiment the constant magnetic field is generated by applying a direct current to both the excitation coil 20 and the sense coil 30. The excitation coil 20 and the sense coil 30 are connected to direct current sources 24 and 34, respectively. By means of capacitors 25, 26 and 36 the d.c. and a.c. currents in the coils are separated. Via a coupling to the control unit 40, the constant magnetic field can be switched on and off or changed in strength. If in this embodiment the quasi-static magnetic field is a very low frequency alternating field, the separation of the various frequencies has to be performed by appropriate high- and low-pass filters in stead of the capacitors 25, 26 and 36.

The magnets for generating the quasi-static saturating magnetic field may also be orientated such that the north poles, or south poles, all face the battery or accumulator. In that case the flux lines don not pass through the battery but spread out in a shear field in the longitudinal direction inside the battery.

It is remarked that, within the framework of the present invention, the number of frequencies, and the values of those frequencies can be adapted to the types of batteries and accumulators that is expected to be sorted. If a certain contamination in a recycling process is acceptable and the amount of batteries of the contaminating type is low, it would be acceptable to forego with measurements for the selection of the contaminating type. When new types of batteries or accumulators are introduced, measurements at other or additional frequencies might become more suitable.

What is claimed is:

1. Apparatus for determining the type of battery or accumulator (10), the apparatus comprising at least one excitation coil (20) coupled to energizing means (21, 22, 23) for generating an alternating magnetic field and thereby inducing an alternating current in said battery or accumulator (10), means for placing the battery or accumulator (10) in said alternating magnetic field and detection means (30, 31, 32) for measuring induced current during the presence of the battery or accumulator (10) in the alternating magnetic field, characterized in that the apparatus further comprising means (41, 42, 24, 34) for establishing a quasi-static magnetic field in the battery or accumulator (10) during the measurement of the induced current, said quasi-static magnetic field being applied for causing a substantial saturation in at least a portion of ferromagnetic parts of the battery or accumulator (10) and in that the energizing means (21, 22, 23) is arranged for energizing the excitation coil (20) with at least one frequency selected from a low frequency in the range between about 1 kHz and about 5 kHz, preferably about 3 kHz, and a high frequency in the range above about 10 kHz, preferably about 40 kHz.

2. Apparatus for determining the type of battery or accumulator (10), the apparatus comprising at least one excitation coil (20) coupled to energizing means (21, 22, 23) for generating an alternating magnetic field and thereby inducing an alternating current in said battery or accumulator (10), means for placing the battery or accumulator (10) in said alternating magnetic field and detection means (30, 31, 32) for measuring induced current during the presence of the battery or accumulator further comprising means (41, 42, 24, 34) for establishing a quasi-static magnetic field in the battery or accumulator (10) during the measurement of the induced current, said quasi-static magnetic field being applied for causing a substantial saturation in at least a portion of ferromagnetic parts of the battery or accumulator (10), in that said detection means comprise at least a sense coil, (30) placed near the excitation coil (20), in that said excitation and sense coils (20, 30) are arranged for surrounding the battery or accumulator (10) during measurement of the induction and in that the energizing means (21, 22, 23) is arranged for energizing the excitation coil (20) with at least one frequency selected from a low frequency in the range between about 1 kHz and about 5 kHz, preferably about 3 kHz, and a high frequency in the range above about 10 kHz, preferably about 40 kHz.

3. Apparatus for determining the type of battery or accumulator (10), the apparatus comprising at least one excitation coil (20) coupled to energizing means (21, 22, 23) for generating an alternating magnetic field and thereby inducing an alternating current in said battery or accumulator (10), means for placing the battery or accumulator (10) in said alternating magnetic field and detection means 30, 31, 32) for measuring induced current during the presence of the battery or accumulator (10) in the alternating magnetic field, characterised in that the apparatus further comprising means (41, 42, 24, 34) for establishing a quasi-static magnetic field in the battery or accumulator (10) during the measurement of the induced current, said quasi-static magnetic field being applied for causing a substantial saturation in at least a portion of ferromagnetic parts of the battery or accumulator (10), in that the energizing means (21, 22, 23) are arranged for energizing the excitation coil (20) with at least one frequency selected from a low frequency in the range between about 1 kHz and about 5 kHz, preferably about 3 kHz and a high frequency in the range above about m 10 kHz, preferably about 40 kHz an in that the energizing means (21, 22, 23) are arranged for energizing the excitation coil with an alternating current of constant amplitude.

4. Apparatus according to claim 1, characterised in that the energising means (21, 22, 23) is arranged for energising the excitation coil (20) with an intermediate frequency in the range between about 5 kHz and about 10 kHz.

5. Apparatus according to claim 1, characterised in that the energising means (21, 22, 23) is arranged for simultaneously energising the excitation coil (20) at various frequencies and in that the detection means (31, 32) is arranged for measuring the induction at the various frequencies simultaneously.

6. An apparatus according to claim 5 wherein the energizing means (21, 22, 23) is arranged for energizing the excitation coil (20) with an intermediate frequency in the range between about 5 kHz and about 10 kHz.

7. An apparatus according to claim 1 wherein said means for establishing a quasi-static magnetic field comprise a current source (24) coupled to said excitation coil (20) for providing a quasi-static current thereto.

8. An apparatus according to claim 4 wherein said means for establishing a quasi-static magnetic field comprise a current source (24) coupled to said excitation coil (20) for providing a quasi-static current thereto.

9. An apparatus according to claim 5 wherein said means for establishing a quasi-static magnetic field comprise a current source (24) coupled to said excitation coil (20) for providing a quasi-static current thereto.

* * * * *